United States Patent

Elliott

[15] 3,636,781

[45] Jan. 25, 1972

[54] INCREMENTAL ROTATION APPARATUS

[72] Inventor: Robert R. Elliott, La Crescenta, Calif.

[73] Assignee: Bell & Howell Company, Chicago, Ill.

[22] Filed: Oct. 2, 1969

[21] Appl. No.: 863,291

[52] U.S. Cl. ....................74/125.5, 192/48.92

[51] Int. Cl. ....................F16h 29/00

[58] Field of Search ....................74/125.5, 126, 142, 143; 192/48.92, 49.92

[56] References Cited

UNITED STATES PATENTS

| | | | |
|---|---|---|---|
| 2,541,872 | 2/1951 | Hendricks | 192/48.92 |
| 2,924,317 | 2/1960 | Holstein | 192/48.92 |
| 3,044,350 | 7/1962 | Hartnett | 74/125.5 |
| 3,062,063 | 11/1962 | Carlson | 74/125.5 |
| 3,489,024 | 1/1970 | Ramstetter | 74/125.5 |

*Primary Examiner*—William F. O'Dea
*Assistant Examiner*—Wesley S. Ratliff, Jr.
*Attorney*—David Weiss

[57] ABSTRACT

Apparatus for providing incremental rotation of a shaft and having a continuous drive capability. A plurality of unidirectional clutches are coupled in operative arrangement to the shaft such that the shaft is rotatable in one direction only relative to the clutches. First drive means is coupled to one of the clutches for incrementally driving the shaft in the one direction, while the outer housing of a second one of the clutches is maintained stationary for preventing backlash of the shaft. A third one of the clutches coupled to a motor for continuously driving the shaft. A preferred embodiment of the invention is utilized for incrementally driving a tape capstan and alternatively for continuously driving the capstan, and can further be provided with second drive means coupled to a fourth one of the clutches for producing an interblock gap on the tape.

12 Claims, 1 Drawing Figure

PATENTED JAN 25 1972
3,636,781
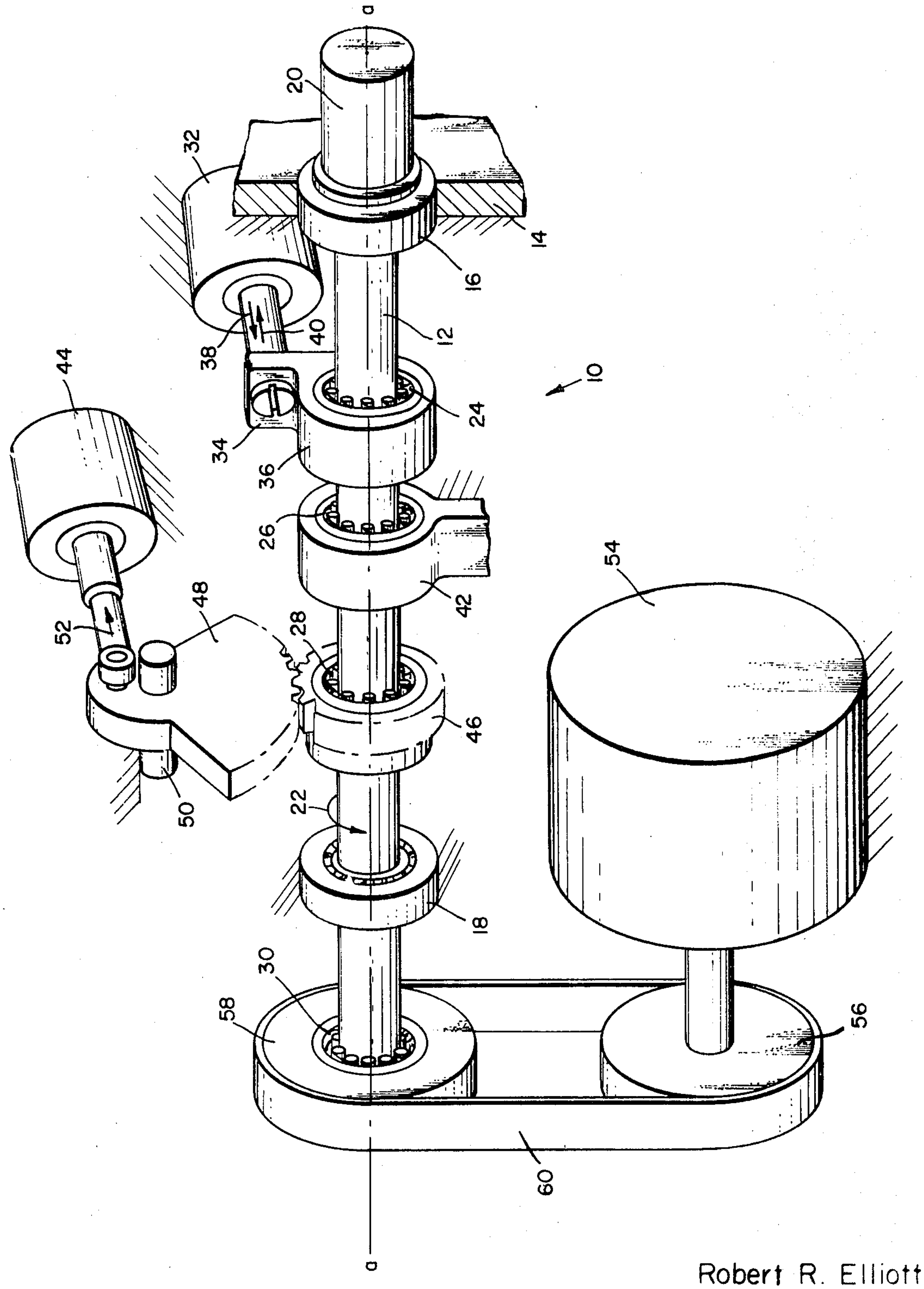
Robert R. Elliott
INVENTOR
BY.
David Weiss
ATTORNEY.

INCREMENTAL ROTATION APPARATUS

BACKGROUND OF THE INVENTION

1. Field of the Invention.

This invention relates to rotational drive apparatus, and more particularly to unidirectional rotational apparatus having an incremental and a continuous drive capability.

2. Description of the Prior Art.

In many data processing systems, digital information is recorded in incremental fashion on magnetic or paper tape, and the recorded information can be played back either incrementally or continuously. In such systems, the tape is caused to be incrementally transported past a suitable "write" transducer (such as a magnetic head or a paper punch apparatus), and data is recorded thereon between incremental advances of the tape. The recorded information can be played back by either incrementally or continuously transporting the tape past a suitable "read" transducer (such as photoelectric apparatus), in paper tape systems; and in magnetic tape systems, by continuous transport of the tape past the magnetic head.

Often, the record mode includes a "store-and-forward" capability; i.e., the digital information can be recorded piecemeal and during varying time intervals, and is "stored" on the tape. After sufficient information has been recorded, the information can be rapidly played back, or "forwarded" for transmission or to a computer. For such systems, the tape mast remain stationary between recording times—the apparatus maintaining a "holding" position in anticipation of receiving further information.

Incremental drive apparatus which can be utilized for incrementally driving a tape-engaging device (such as a capstan in a magnetic tape system, or a sprocket device in a paper tape system) are well known to the prior art. For example, an incremental or "stepper" motor is often used for such purposes. A disadvantage of stepper motors for store-and-forward applications is a requirement that electrical power be continuously applied to the motor in order to maintain the output shaft at a particular rotational position and in a standby condition. Accordingly, a stepper motor is not "self-holding," and a substantial amount of power is required for its operation.

In a second type of commonly employed incremental rotation drive apparatus of the prior art, incremental rotation is provided through various combinations of rachet and pawl apparatus. Since the rachet is present in such apparatus, the step or increment of rotation which can be produced is not subject to adjustment. Furthermore, undesired oscillations are usually generated at the end of each step.

Moreover, in recorder/playback apparatus utilizing either type of the incremental rotational drive systems of the prior art, a separate drive system is generally required for providing a continuous playback capability.

SUMMARY OF THE INVENTION

The present invention finds utility wherever it is desired to provide an incremental rotation of a shaft, and apparatus according to the present invention can be advantageously utilized in combination with digital recording and/or playback apparatus for providing an incremental drive therefor which is economical and simple in both construction and operation. The apparatus is capable of step adjustment through a wide range of rotational angles and stepping speeds. In operation, the present apparatus maintains a holding or standby condition without application of electrical power, while substantially eliminating the occurrence of adverse oscillations at the end of each step.

In accordance with the present invention, the incremental rotation apparatus includes a drive shaft rotatably supported about its longitudinal axis, and is provided with two unidirectional or overrunning clutches which are similarly oriented for permitting shaft rotation in only one direction.

First drive means is coupled to one of the unidirectional clutches, for driving the shaft through a predetermined rotation when actuated. The outer housing of the second unidirectional clutch is maintained in a fixed position, for preventing backlash of the shaft at the end of each step.

If desired, the shaft can be rotated through a larger rotational angle (for example, for providing the driven tape with an unrecorded length between successive blocks of data, generally known as an "interblock gap"). A third similarly oriented unidirectional clutch is provided, the outer housing of which is driven by second drive means for rotating the shaft through a second predetermined rotational angle when actuated.

For driving the shaft in a continuous manner, a fourth similarly oriented unidirectional clutch is coupled to the shaft. The outer housing of the fourth clutch is drivably coupled to a continuous drive means, such as a DC motor, acting through suitable transmission means.

Since the four unidirectional clutches are oriented for shaft rotation (i.e., are nonlocking) in the same direction, each of the three drive means can be alternatively operated without being affected by the presence of the other two nonoperating drive means.

BRIEF DESCRIPTION OF THE DRAWING

The novel features which are believed to be characteristic of the invention, together with further advantages thereof, will be better understood from the following description considered in connection with the accompanying drawing in which a preferred embodiment of the invention is illustrated by way of example. It is to be expressly understood, however, that the drawing is for the purpose of illustration and description only, and is not intended as a definition of the limits of the invention.

The drawing is a perspective diagram of a preferred embodiment of incremental rotation apparatus, including provision for producing an interblock gap and further including provision for continuous rotation of the rotatable member, all of which being in accordance with the present invention.

DETAILED DESCRIPTION OF THE PREFERRED EMBODIMENT

Turning to the drawing, the preferred embodiment of the present invention comprises a capstan drive system 10 for combination with tape recorder/playback apparatus, for driving tape (such as magnetic tape or paper tape) past suitable transducer means in such manner as to permit both writing and reading of digital information on the tape.

A drive shaft 12 is mounted to support means such as a frame 14 (which can be included by the recorder/playback apparatus), for rotation about a longitudinal axis a—a. A pair of bearings 16, 18 can be provided for this purpose, and the shaft 12 can be provided with a capstan 20 projecting from the frame 14 for driving the tape in accordance with motion transmitted to the capstan 20 from the shaft 12.

The shaft 12 is free to rotate about the longitudinal axis on only one direction, for example a counterclockwise direction as indicated by the arrow 22. The shaft 12 is coupled in operative engagement to a plurality of unidirectional or overrunning clutches 24, 26, 28, 30, each of which is oriented for permitting shaft rotation in the counterclockwise direction, while restraining opposite or clockwise rotation of the shaft.

The unidirectional clutches 24, 26, 28, 30 can be of any type known to the art, which overrun with respect to a coupled shaft in one direction and lock onto the shaft in an opposite direction. One example of a suitable type unidirectional clutch is manufactured by the Torrington Company and sold under the designation "Torrington Drawn Cup Roller Clutch," although unidirectional clutches of other designations and manufactured by other manufacturers can, of course, be utilized for practicing the present invention. Such clutches are characterized by their near-zero backlash when reversed.

Precisely controlled incremental shaft rotation is provided by appropriately driving the outer housing of the first or incremental drive clutch 24, while maintaining the outer housing of the second or retention clutch 26 rigidly coupled to the frame 14. For example, the outer housing of the incremental drive clutch 24 can be driven alternately in the counterclockwise and clockwise directions by means of a first solenoid 32 drivably coupled to an arm 34 of a first clamp 36, the clamp 34 being rigidly mounted about the clutch 24.

When the plunger of the first solenoid 32 is actuated to move in the direction shown by the arrow 38, the incremental drive clutch 24 locks onto the shaft 12 and accordingly drives the shaft in the counterclockwise direction. During the plunger return stroke (of the first solenoid 32) in the direction of the arrow 40 (opposite arrow 38) the incremental drive clutch 24 is unlocked from the shaft 12 and is overrunning with respect thereto. Accordingly, each predetermined rotation of the incremental drive clutch 24 is the counterclockwise direction is succeeded by the first solenoid's driving the incremental drive clutch 24 through the same predetermined rotation in the clockwise direction. Although a push-pull-type solenoid 32 is shown in the drawing, a rotary-type solenoid can be alternatively utilized.

In order to assure the absence of backlash of the shaft 12 (i.e., clockwise rotation) during the solenoid's return stroke, a second clamp 42 is rigidly mounted about the outer housing of the retention clutch 26 and rigidly attached to the frame 14. Accordingly, any tendency of the shaft 12 to assume a clockwise rotation is restrained.

The increment of rotation provided to the drive shaft 12 upon each actuation of the first solenoid 32 can be precisely controlled by adjustment or selection of the solenoid stroke length and/or the length of the arm 34. Increment speed is controlled by the frequency of solenoid actuation which, of course, can be varied as desired. Although the upper limit of increment speed is restricted by the rise and fall times of available solenoids, higher speeds can be obtained by utilizing magnetostrictive devices or bistable actuators which can be driven alternately at high pulse rates.

Utilizing the incremental motion apparatus described above and as shown in the drawing, apparatus has been manufactured with increment speeds controlled between 1 and 240 increments per second, and increment rotational angles as small as one-half degree. In combination with a magnetic tape recorder/playback apparatus, and utilizing a ½-inch diameter capstan 20, the incremental rotation apparatus has produced bit densities as high as 1,000 linear bits per inch, and in particular the apparatus can be controlled to produce bit densities of 200, 556 and 800 linear bits per inch.

The capstan drive system 10 can be provided a spacing capability, if desired, for producing a space between successive blocks of recorded data, or an interblock gap. This is accomplished by providing means for driving the outer housing of the third unidirectional or spacer drive clutch 28 through a predetermined rotation, preferably greater than the increment of rotation provided by the driven incremental clutch 24.

For example, a second solenoid 44 can be provided which, when actuated, drives the housing of the spacer drive clutch 28 through the predetermined rotation by means of a suitable transmission or linkage coupling the plunger of the second solenoid 44 and the spacer drive clutch 28. A housing gear 46 can be rigidly attached to the housing of the spacer drive clutch 28, for meshing with a gear segment 48 pivotally supported about a pivot shaft 50 and drivably coupled to the plunger of the second solenoid 44.

When the plunger of the second solenoid 44 is actuated in the direction of the arrow 52, the housing gear 46 is driven in the counterclockwise direction. Accordingly, the spacer clutch 28 locks onto the drive shaft 12 and drives the shaft in the counterclockwise direction. During the plunger return stroke (of the second solenoid 44) in the direction opposite the arrow 52, the spacer drive clutch 28 is unlocked from the shaft 12 and is overrunning with respect thereto; any backlash tendency of the shaft 12 is restrained by the retention clutch 26 and rigidly mounted second clamp 42 combination. Accordingly, each predetermined rotation of the spacer clutch 28 in the counterclockwise direction is succeeded by the second solenoid's driving the spacer clutch 28 through the same predetermined rotation in the clockwise direction. Of course, a rotary-type solenoid can be substituted for the push-pull-type solenoid 44 shown in the drawing.

The amount of rotation provided to the drive shaft 12 upon each actuation of the second solenoid 44 is determined in accordance with the solenoid stroke length, the mechanical ratio between the housing gear 46 and the gear segment 48, and the distance between the plunger connection to the gear segment 48 and the pivot axis of the gear segment.

It should be noted that since the drive shaft 12 is rotatable in only one direction about its longitudinal axis *a—a*, the capstan drive system 10 shown in the drawing can be further simplified, if desired, by omitting one of the bearings 16, 18. In such case, the retention clutch 26 and second clamp 42 combination, in addition to the remaining one of the bearings 16, 18, would serve for rotatably supporting the drive shaft 12 to the frame 14.

The capstan drive system 10 can be provided with means for driving the shaft 12 in a continuous manner. For this purpose, continuous drive means is coupled to the fourth or continuous drive clutch 30 for continuously driving the outer housing thereof when desired. This capability is advantageously utilized for continuously reading digital data previously recorded on the tape during the read mode of the associated tape playback apparatus, as well as for providing the capstan drive system 10 with a fast-forward capability.

The outer housing of the continuous drive clutch 30 can be driven by continuous motor means, such as a DC motor 54 drivably coupled to the outer housing of the continuous drive clutch 30 through suitable transmission means. For example, a drive pulley 56 can be rigidly connected to the output shaft of the DC motor 54, for driving a driven pulley 58 (rigidly mounted about the outer housing of the continuous drive clutch 30) in the counterclockwise direction by means of a belt 60. The rotational speed of the drive shaft 12 can be accurately controlled for any desired capstan speed; for example, by providing suitable tachometer means (not shown) in operative arrangement with the DC motor 54, such arrangements being well known to the servomechanism art.

Thus, there has been shown a preferred embodiment of incremental rotation apparatus having a continuous drive capability. The preferred embodiment can be utilized in combination with digital tape recording and/or playback apparatus, and can be further provided with means for producing an interblock gap on the tape. Other embodiments of the present invention, and modifications of the embodiment herein presented, may be developed without departing from the essential characteristics thereof.

Accordingly, the invention should be limited only by the scope of the claims listed below.

What is claimed is:

1. Incremental rotation apparatus comprising the combination of:

support means;

a shaft having a longitudinal axis and rotatably mounted to said support means;

first unidirectional clutch means coupled to said shaft for rotating said shaft in a first direction about said axis when said first clutch means is driven in said first direction;

first drive means coupled to said first unidirectional clutch means for driving said first clutch means through a first predetermined rotation in said first direction when said first drive means is actuated; and second unidirectional clutch means coupled to said support means and to said shaft for preventing rotation of said shaft in a second direction opposite said first direction.

2. The incremental rotation apparatus according to claim 1, above, including means operable after said first direction rotation of said first clutch means for driving said first clutch means in said second direction through said first predetermined rotation.

3. The incremental rotation apparatus according to claim 1, above, further including:

third unidirectional clutch means coupled to said shaft for rotating said shaft in said first direction when said third clutch means is driven in said first direction; and second drive means coupled to said third clutch means for driving said third clutch means through a second predetermined rotation in said first direction greater than said first predetermined rotation when said drive means is actuated.

4. The incremental rotation apparatus according to claim 3, above, including means operable after said first direction rotation of said third clutch means for driving said third clutch means in said second direction through said second predetermined rotation.

5. The incremental rotation apparatus according to claim 1, above, further including:

third unidirectional clutch means coupled to said shaft for rotating said shaft in said first direction when said third clutch means is driven in said first direction; and motor means coupled to said third clutch means for continuously driving said third clutch means in said first direction when said motor means is energized.

6. For combination with tape transport apparatus, apparatus for incrementally moving a tape and alternatively for continuously moving the tape, comprising:

support means;

a shaft having a longitudinal axis and rotatably mounted to said support means;

tape-engaging means for drivably engaging the tape, said tape-engaging means coupled to said shaft for being driven thereby;

a plurality of unidirectional clutches coupled to said shaft, said shaft rotatable in one direction only about said axis relative to said clutches;

first drive means coupled to one of said clutches for driving said shaft through a first predetermined rotation in said one direction when said first drive means is actuated;

means coupling a second one of said clutches to said support means for preventing rotation of said shaft opposite said one direction relative to said support means; and motor means coupled to a third one of said clutches for rotatably driving said shaft in said one direction about said axis.

7. The apparatus according to claim 6, above, further including:

second drive means coupled to a fourth one of said clutches for driving said shaft through a second predetermined rotation greater than said first predetermined rotation in said one direction when said second drive means is actuated.

8. Incremental rotation apparatus comprising the combination of:

support means;

a shaft having a longitudinal axis and rotatably mounted to said support means;

first unidirectional clutch means coupled to said shaft, said shaft rotatable about said axis in one direction only relative to said first unidirectional clutch means;

first drive means coupled to said first unidirectional clutch means for driving said shaft through a first predetermined rotation in said one direction when said first drive means is actuated;

second unidirectional clutch means coupled to said shaft and to said support means, said shaft rotatable in said one direction only about said axis relative to said support means;

third unidirectional clutch means coupled to said shaft, said shaft rotatable in said one direction about said axis relative to said third unidirectional clutch means; and second drive means coupled to said third unidirectional clutch means for driving said shaft through a second predetermined rotation in said one direction.

9. The incremental rotation apparatus according to claim 8, above, further including:

fourth unidirectional clutch means coupled to said shaft, said shaft rotatable in said one direction about said axis relative to said fourth unidirectional clutch means; and motor means coupled to said fourth unidirectional clutch means for rotatably driving said shaft in said one direction about said axis.

10. For combination with tape transport apparatus, apparatus for incrementally moving a tape, comprising:

support means;

a shaft having a longitudinal axis and rotatably mounted to said support means;

tape engaging means for drivably engaging the tape, said tape engaging means coupled to said shaft for being driven thereby;

a plurality of unidirectional clutches coupled to said shaft, said shaft rotatable in one direction only about said axis relative to said clutches;

first drive means coupled to one of said clutches for driving said shaft through a first predetermined rotation in said one direction when said first drive means is actuated; and means coupling a second one of said clutches to said support means for preventing rotation of said shaft opposite said one direction relative to said support means.

11. The apparatus according to claim 10, above, further including:

second drive means coupled to a third one of said clutches for driving said shaft through a second predetermined rotation in said one direction when said second drive means is actuated.

12. The apparatus according to claim 11, above, further including:

motor means coupled to a third one of said clutches for rotatably driving said shaft in said one direction about said axis, for continuously moving the tape.

* * * * *